UNITED STATES PATENT OFFICE.

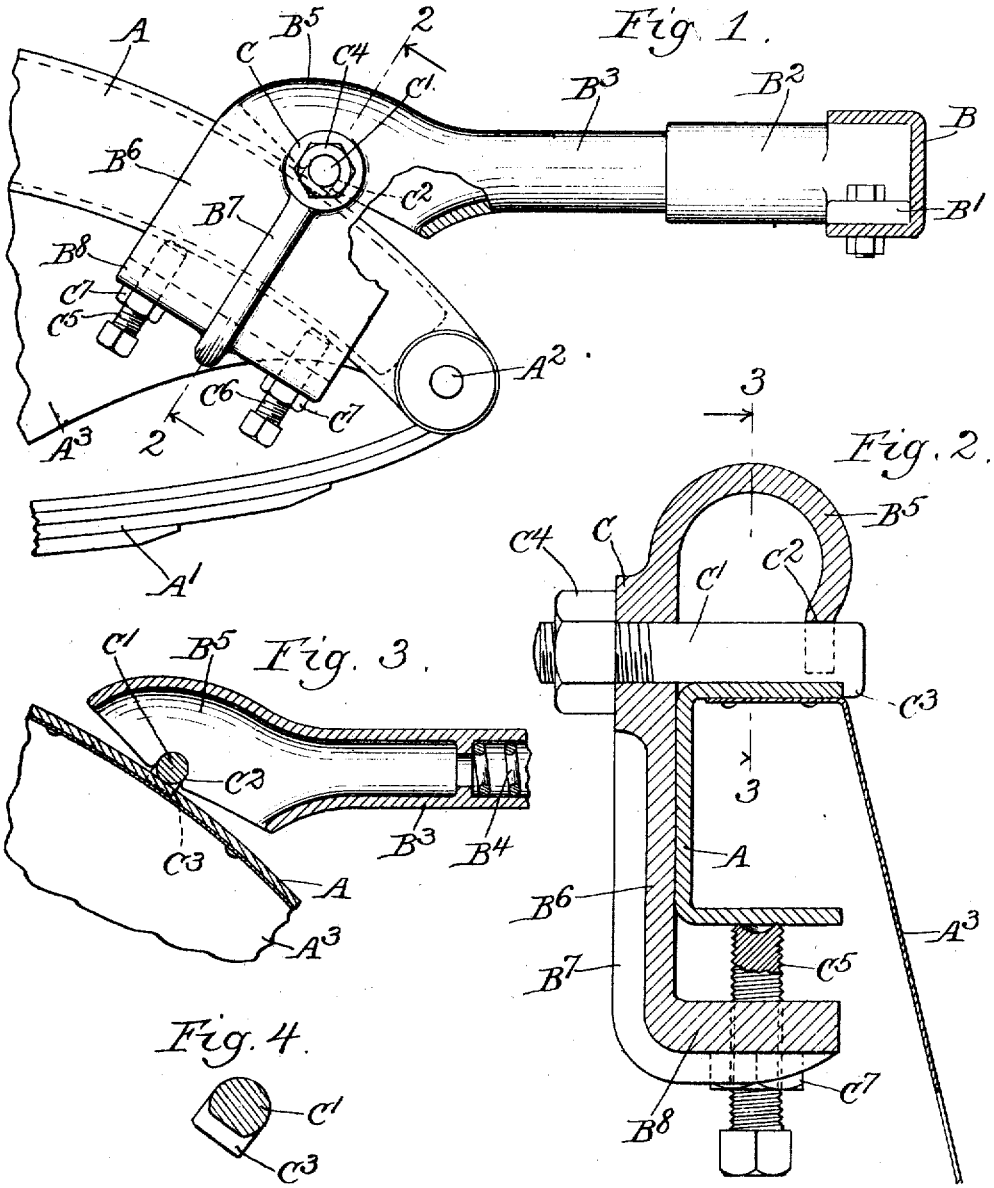

LEWIS P. HALLADAY, OF STREATOR, ILLINOIS.

BUMPER.

1,273,482.　　　Specification of Letters Patent.　　Patented July 23, 1918.

Application filed January 22, 1917. Serial No. 143,659.

*To all whom it may concern:*

Be it known that I, LEWIS P. HALLADAY, a citizen of the United States, residing at Streator, in the county of La Salle and State of Illinois, have invented a certain new and useful Improvement in Bumpers, of which the following is a specification.

My invention relates to improvements in bumper brackets, motor vehicles and the like, and has for one object to provide a new and improved form of brackets, which may be attached to the forward end of an automobile or other vehicle frames no matter what the inclination of the forward end is. Another object is to provide a bracket which may be attached to the frame without cutting or otherwise interfering with any apron, mud-guard, or the like which may be located on the inside of the frame member. Another object is to provide a bracket which will be universal in its attachment and use and which may be attached to any type of motor vehicle frames. Other objects will appear from time to time in the specification.

My invention is illustrated more or less diagrammatically in the accompanying drawings, wherein—

Figure 1 is a side elevation of the forward end of an automobile frame showing parts in sections;

Fig. 2 is a section along line 2—2 of Fig. 1;

Fig. 3 is a section along line 3—3 of Fig. 2; and Fig. 4 is a section through the holding bolts.

Like parts are indicated by like characters in all the figures.

A is the forward end or horn of the ordinary type of automobile frame. $A^1$ is the usual type of spring pivoted at its forward end to the forward end of the frame on the spring bolt $A^2$. $A^3$ is the usual type of splash apron. This apron is attached to the frame member and extends down in front of the car in the usual manner closing the gap between the frame members, and the radiator and other vehicle and engine parts. B is the bumper bar. It is bolted to the flange $B^1$ on the sliding head $B^2$ which sliding head is mounted upon a hollow bracket arm $B^3$. This arm $B^3$ contains a spring $B^4$ which is adapted to yieldingly resist rearward movement of the sliding head and bumper bar to protect the frame. $B^5$ is a hollow bracket member or supporting part adapted to overlie the upper forward surface of the frame A, that part of the bracket above the frame A, being substantially U shaped in cross section as shown in Fig. 2 and is provided on one side with the downwardly extending apron $B^6$, which apron rests against the outer side of the frame A. Apron $B^6$ is reinforced by the rib $B^7$ and terminates in an inwardly extending flange member $B^8$ around which the reinforcing rib $B^7$ extends to give stiffness and rigidity to the parts.

The rib $B^7$ terminates at its upper end in a boss C which is apertured to receive a bolt $C^1$, engaging a slot $C^2$ in the opposed side of the member $B^5$, so that the bolt is supported at both ends. This bolt is flanged at $C^3$ to engage the inner edge of the frame and provided with a nut $C^4$ adapted to draw the bolt outwardly to clamp the frame between the flange and the apron member $B^6$. $C^5$, $C^6$ are set screws passing through the flange $B^8$ provided with lock nuts $C^7$. These set screws are arranged one on each side of the bolt $C^1$ and in a plane perpendicular to that bolt and located substantially at the center of that portion of the bolt in engagement with the upper surface of the frame.

While I have shown in my drawings an operative device, still many changes might be made both in size and shape and arrangement of parts, without departing materially from the spirit of my invention. I wish therefore that my drawings be regarded in a sense diagrammatic.

The use and operation of my invention are as follows:

The entire bumper is assembled before it leaves the factory. When the operator wishes to apply it to a car, he screws out the set screws and loosens the nut and places the part on the frame of a motor vehicle, with the apron engaging the outside edge or the wall of the frame and with the bolt resting upon the upper surface of the frame. He then rotates the bolt until the flange thereon engages the frame and tightens up on the nut, to hold the parts in position. He then manipulates the two set screws so as to rock the whole member about the bolt as its pivot line, until the parts assume a substantially horizontal position. He then tightens the bolt finally to jam the apron against the side of the frame and tightens up the set screws until the cups on their ends bite into the frame. Then by tightening the lock nut, the parts will be permanently held in position. The bumper member is thus in effect, supported on what amounts to a three-point support on the frame being free to be adjusted but rigidly held against movement in service.

In Fig. 4 the bolt is shown flattened on one side to engage the frame, though it will be evident that a round bolt may be used as shown in Fig. 2 but either form of bolt would be satisfactory.

The part of the support which is to be connected to the frame member I have called the body portion and I have associated with it the bolt which acts as a fulcrum though, of course, any other fulcruming member would answer and the two adjustable parts whereby the body can be locked on the fulcrum and held securely in position. The preferred arrangement is that wherein the fulcrum is on top of the frame member and the adjustable parts are below. Another form of the device is that wherein the fulcrum is placed opposite a point which lies between the two adjustable engaging parts. The bolt is employed as a fulcrum because of the greater ease in manufacture and greater strength that may be obtained by that form of structure.

I claim:

1. A support for automobile bumpers comprising a body adapted partially to inclose one of the automobile frame members and having a fulcrum adapted to contact one side of such member and two adjustable engaging parts adapted to contact the other side of such member.

2. A support for automobile bumpers comprising a body adapted partially to inclose one of the automobile frame members and having a fulcrum adapted to contact the upper side of such member and two adjustable engaging parts adapted to contact the lower side of such member.

3. A support for automobile bumpers comprising a body adapted partially to inclose one of the automobile frame members and having a fulcrum adapted to contact one side of such member and two adjustable engaging parts adapted to contact the other side of such member the fulcrum being opposite a point which lies between the two adjustable engaging parts.

4. A support for automobile bumpers comprising a body adapted partially to inclose one of the automobile frame members and having a fulcrum adapted to contact the upper side of such member and two adjustable engaging parts adapted to contact the lower side of such member, the fulcrum being opposite a point which lies between the two adjustable engaging parts.

5. A support for automobile bumpers comprising a body adapted partially to inclose one of the automobile frame members and having a fulcrum adapted to contact one side of such member and two adjustable engaging parts adapted to contact the other side of such member, said fulcrum consisting of a transverse bolt mounted in the body.

6. A support for automobile bumpers comprising a body adapted partially to inclose one of the automobile frame members and having a fulcrum adapted to contact the upper side of such member and two adjustable engaging parts adapted to contact the lower side of such member said fulcrum consisting of a transverse bolt mounted in the body.

7. A support for automobile bumpers comprising a body adapted partially to inclose one of the automobile frame members and having a fulcrum adapted to contact one side of such member and two adjustable engaging parts adapted to contact the other side of such member the fulcrum being opposite a point which lies between the two adjustable engaging parts said fulcrum consisting of a transverse bolt mounted in the body.

8. A support for automobile bumpers comprising a body adapted partially to inclose one of the automobile frame members and having a fulcrum adapted to contact the upper side of such member and two adjustable engaging parts adapted to contact the lower side of such member the fulcrum being opposite a point which lies between the two adjustable engaging parts said fulcrum consisting of a transverse bolt mounted in the body.

9. A support for automobile bumpers comprising a body adapted partially to inclose one of the automobile frame members and having a fulcrum adapted to contact one side of such member and two adjustable engaging parts adapted to contact the other side of such member, said fulcrum consisting of a transverse bolt mounted in the body adjustably secured at one end to the body and provided with a flange at its other end to overhang the side of the frame.

10. A support for automobile bumpers comprising a body adapted partially to inclose one of the automobile frame members and having a fulcrum adapted to contact the upper side of such member and two adjustable engaging parts adapted to contact the lower side of such member said fulcrum consisting of a transverse bolt mounted in the body adjustably secured at one end to the body and provided with a flange at its other end to overhang the side of the frame.

11. A support for automobile bumpers comprising a body adapted partially to inclose one of the automobile frame members and having a fulcrum adapted to contact one side of such member and two adjustable engaging parts adapted to contact the other side of such member the fulcrum being opposite a point which lies between the two adjustable engaging parts, said fulcrum consisting of a transverse bolt mounted in the body adjustably secured at one end to the body and provided with a flange at its other end to overhang the side of the frame.

12. A support for automobile bumpers comprising a body adapted partially to inclose one of the automobile frame members and having a fulcrum adapted to contact the upper side of such member and two adjustable engaging parts adapted to contact the lower side of such member the fulcrum being opposite a point which lies between the two adjustable engaging parts said fulcrum consisting of a transverse bolt mounted in the body adjustably secured at one end to the body and provided with a flange and its other end to overhang the side of the frame.

13. In a support for automobile bumpers, a U-shaped body adapted partially to inclose one of the automobile frame members, a fulcrum at one side of the U, adapted to engage one side of the frame member, and two adjustable engaging parts mounted in the opposite side of the U, adapted to engage the other side of the frame member.

14. In a support for automobile bumpers, a U-shaped body adapted partially to inclose one of the automobile frame members, a fulcrum at one side of the U, adapted to engage one side of the frame member, and two adjustable engaging parts mounted in the opposite side of the U, adapted to engage the other side of the frame member, the fulcrum being opposite a point which lies between the two adjustable engaging parts.

15. In a support for automobile bumpers, a U-shaped body adapted partially to inclose one of the automobile frame members, a bolt at one side of the U, mounted transversely to engage one side of said frame member, two adjustable screws mounted on the opposite side of the U, adapted to engage the other side of said frame member.

16. In a support for automobile bumpers, a U-shaped body adapted partially to inclose one of the automobile frame members, a bolt at one side of the U mounted transversely to engage one side of said frame member, two adjustable screws mounted on the opposite side of the U, adapted to engage the other side of said frame member, the bolt being opposite a point which lies between the two screws.

In testimony whereof, I affix my signature in the presence of two witnesses this 18th day of January, 1917.

LEWIS P. HALLADAY.

Witnesses:
H. W. LUKINS,
FRED C. BERTIAUX.